US007395902B2

(12) United States Patent  
D'Arca et al.

(10) Patent No.: US 7,395,902 B2
(45) Date of Patent: Jul. 8, 2008

(54) HAND DEACTIVATED SHOPPING CART AUTOMATIC BRAKING SYSTEM (75) Inventors: Paul D'Arca, 17328 Regency Cir., Riverside, CA (US) 92503; Monty Hutchison, Colton, CA (US)

(73) Assignee: Paul D'Arca, Riverside, CA (US)

( * ) Notice: Subject to any disclaimer, the term of this patent is extended or adjusted under 35 U.S.C. 154(b) by 195 days.

(21) Appl. No.: 11/057,914

(22) Filed: Feb. 15, 2005

(65) Prior Publication Data

US 2005/0194219 A1 Sep. 8, 2005

Related U.S. Application Data (63) Continuation-in-part of application No. 10/794,622, filed on Mar. 8, 2004, now abandoned.

(51) Int. Cl.
B62B 5/04 (2006.01)
B62C 7/02 (2006.01)

(52) U.S. Cl. .............................. 188/19; 188/31; 188/69; 280/33.991; 280/651

(58) Field of Classification Search .................. 188/19, 188/20, 21, 22, 31, 29, 30, 17, 174, 69; 280/33.994, 280/33.991, 33.992, 33.996, 33.997, 651; 74/491, 503
See application file for complete search history.

(56) References Cited

U.S. PATENT DOCUMENTS

| 50,402 | A | * | 10/1865 | Stoops | 188/69 |
|---|---|---|---|---|---|
| 308,882 | A | * | 12/1884 | Dillin | 188/20 |
| 583,079 | A | * | 5/1897 | Parrett et al. | 188/20 |
| 716,717 | A | * | 12/1902 | Jones | 188/20 |
| 717,922 | A | * | 1/1903 | Ramscar | 188/20 |
| 784,443 | A | * | 3/1905 | Starbard | 188/20 |
| 1,861,958 | A | * | 6/1932 | Gallinant | 188/20 |
| 2,254,786 | A | * | 9/1941 | Snyder | 188/20 |
| 2,605,116 | A | * | 7/1952 | Alexander | 280/33.996 |
| 2,958,537 | A | * | 11/1960 | Young | 188/20 |
| 3,095,211 | A | * | 6/1963 | Altherr | 280/33.994 |
| 3,174,768 | A | * | 3/1965 | Sanders et al. | 188/31 |
| 3,458,015 | A | | 7/1969 | Collins et al. | |
| 3,500,965 | A | | 3/1970 | Nossokoff et al. | |
| 3,501,164 | A | * | 3/1970 | Peterson | 280/33.994 |
| 4,018,449 | A | | 4/1977 | Anderson | 280/33.99 |
| 4,840,388 | A | | 6/1989 | Doughty | 280/33.994 |
| 4,976,447 | A | | 12/1990 | Batson | 280/33.994 |
| 5,090,517 | A | | 2/1992 | Doughty | 188/19 |
| 5,288,089 | A | | 2/1994 | Bowers et al. | 280/33.994 |
| 5,325,938 | A | | 7/1994 | King | 188/19 |
| 5,499,697 | A | | 3/1996 | Trimble et al. | 188/19 |
| 5,560,626 | A | * | 10/1996 | Glazer et al. | 280/33.994 |
| 5,735,367 | A | | 4/1998 | Brubaker | 188/19 |
| 6,199,878 | B1 | | 3/2001 | Masserant et al. | 280/33.994 |
| 2002/0093155 | A1 | | 7/2002 | Scott | 280/33.994 |
| 2004/0144601 | A1 | | 7/2004 | Otterson | 188/19 |

* cited by examiner

Primary Examiner—Thomas J Williams (57) ABSTRACT

A braking system designed to be an integral part of a shopping cart. The braking system consists of a hand-operated brake that is gravity actuated and normally engaged. The user disengages the braking system to move the shopping cart, preferably by pushing a primary handle of the cart. The braking system is also disengaged when the shopping cart is nested with other shopping carts to allow multiple carts to be moved without the brakes being engaged. The mechanical link from the handle to the brake is enclosed within the frame to reduce potential damage to the mechanism. The mechanical link consists of a hand-activated handle that is pushed down to disengage the brake, and when the handle is not depressed, the handle raises by gravity and applies the brake.

11 Claims, 8 Drawing Sheets

HAND DEACTIVATED SHOPPING CART AUTOMATIC BRAKING SYSTEM

CROSS-REFERENCES TO RELATED APPLICATIONS

This application is a continuation-in-part of application Ser. No. 10/794,622, filed Mar. 8, 2004 now abandoned.

FIELD OF THE INVENTION

The present invention relates to a braking system that is incorporated into a shopping cart. The purpose of the braking system is to stop or slow a shopping cart when an operator is not present. The braking system is disengaged when the cart is nested with other shopping carts.

BACKGROUND OF THE INVENTION

The field of the invention relates to a braking system used in a shopping cart. More specifically, it relates to a shopping cart with a brake that must be disengaged by the operator to allow movement of the shopping cart. The invention also discloses that, when the shopping cart is nested with other shopping carts, the braking system is disengaged to allow multiple shopping carts to be moved.

Shopping carts are convenient transportation devices that are used when one or multiple items are purchased at a store. Most commercially available shopping carts do not employ a braking system in the shopping cart. One problem with currently available shopping carts is that they can roll away if the cart is placed on a slope. Many people at one time or another have had a shopping cart roll away, or have seen a shopping cart roll down a parking area and stop when the shopping cart came in contact with a car or other object. The ideal shopping cart would provide the convenience of easy mobility when in use, and sufficient braking capacity when the cart is not being pushed or moved. The ideal design would need to be rugged enough to withstand the daily use and pounding imposed on today's shopping carts, and provide safety to users so fingers and clothing are not pinched by the braking mechanism. Simplicity of the design of the shopping cart is important for manufacturing, user understanding, and longevity of the mechanism and the braking surfaces. Several inventions have tried to produce a shopping cart with these features.

U.S. Pat. Nos. 1,709,527, 1,861,958, 2,988,175, 4,018,449, 5,325,938, and 5,735,367 utilize a cable, chain, or other flexible member running either inside a tube, or inside a sheath that is connected to a tube on the shopping cart to manipulate a brake that is applied to the wheel. U.S. Pat. Nos. 2,958,537, 3,095,211, 3,501,164, 4,384,713, 4,840,388, 4,976,447, 5,499,697, 6,199,878 use a rod located outside the frame tube of the shopping cart. All these prior patents provide a link from the handle to the brake, but the linking mechanism is fragile, and subject to intentional or unintentional damage. What is needed is a linkage from the handle to the braking mechanism that is solid, and protected.

Another valuable attribute of the invention is that the operation of the braking mechanism should be easy to use and operate. The method of de-activating the brake should be the same as using the shopping cart. U.S. Pat. Nos. 2,958,537, 5,499,697 require the user to lift the handle to deactivate the brake. U.S. Pat. No. 6,199,878 requires the user to rotate the handle. U.S. Pat. No. 4,976,447 require the user to pull the handle. U.S. Pat. No. 4,840,388 requires the user to grasp or squeeze the handle. None of the listed patents require the user to perform the function of pushing the cart to deactivate the brake, or resting on the handle as the cart is being pushed. In addition, most of the designs require the user to overcome a spring that keeps the handle or brake engaged.

Still another valuable attribute of the invention would involve a braking system that does not reduce the life of the tires on the shopping cart. U.S. Pat. Nos. 3,095,211, 3,501,164, 4,018,449, 4,840,388, 4,976,477, 5,325,938, 5,499,697, 5,735,367 and 6,199,878 utilize a braking system that rubs on at least a part of one tire of the shopping cart. U.S. Pat. No. 2,958,537 uses a pawl that engages a ratchet tooth, and when the pawl in engaged, the wheel is locked into position causing the tire to slide on the ground. What is needed is a braking system that does not abrade the tire to cause the braking of the shopping cart.

While the prior art provides the basic function of slowing or stopping a shopping cart, none of the prior art provides a braking system that disengages the braking system while the cart is being pushed, where the connecting rod is protected from normal and abnormal damage, or the braking system does not abrade the tire surface. The disclosed invention provides unique solutions to each of these previously undisclosed combined improvements.

BRIEF SUMMARY OF THE INVENTION

It is therefore an object of the present invention to provide improvements to prior shopping cart mechanisms and methods.

The invention consists of a braking system that can be attached to, or is an integral part of, a shopping cart. The shopping cart can be of any type of cart that contains a basket for transporting items, has three or more wheels, and a handle or area that is pushed by the operator. The invention provides for a number of improvements that provide additional benefits and improved features for existing shopping carts.

It is a feature of the present invention to provide an improvement to prior shopping cart designs that allow for a braking system that is rugged, user friendly, and does not abrade the tire surface. The improvements also allow for an improvement in the disengagement mechanism that releases the braking mechanism when multiple carts are nested.

Advantages of the de-activation mechanism allows for the brake(s) to be released when the cart is pushed or when the user pushes down on the handle. This is advantageous for use because new users may not be familiar with the operation of the mechanism, and any improvement to shopping cart design should allow users to operate the shopping cart in a manner they would normally operate the cart. It is a further advantage to experienced users that may rest on the handle as they push the cart in a store.

It is a further advantage to use a rugged or protected mechanical link from the handle to the brake to reduce or eliminate damage to the mechanism should the shopping cart be damaged from normal or abnormal use. Damage can be caused from carts being nested, struck by cars, or users trying to bend fragile parts. Many previously identified inventions are not designed to reduce the potential of damage.

Advantages of the disclosed braking system do not impact the life of the wheel. The disclosed braking system provides a positive braking system that locks or slows the tire, and brings the cart to a stop. In a number of prior braking systems, a user might not be able to see the braking mechanism, or the user might not be able to determine if the brakes are activated, or if the cart just has a bad wheel. The tooth and cog mechanism is more visible to the user because the mechanism is located on the side of the wheel.

One embodiment of the invention disclosed herein is a shopping cart with a hand activated wheel braking mechanism comprising a body, a handle assembly rotatably coupled to the body, one or more wheels coupled to the body, and one or more rods rotatably coupled to the handle assembly and extending between the handle assembly and the one or more wheels. The handle assembly, if rotated in a first direction relative to the body, causes each rod of the one or more rods to move away from a wheel of the one or more wheels. If rotated in a second direction opposite the first direction, the handle assembly causes each rod of the one or more rods to move toward a wheel of the one or more wheels. The weight of the one or more rods biases the handle in the second direction, and is sufficient to rotate the handle in the second direction against the force of gravity.

Another embodiment of the invention disclosed herein is a shopping cart comprising a body, first and second wheel assemblies positioned on opposite sides of the body, a handle assembly having first and second arms, each arm pivotably coupled to the body to form a type one lever, each lever arm having a load end and an effort end with a cross member extending between the effort ends of the first and second lever arms, and first and second rods, the first rod pivotably fastened to the load end of the first lever arm and extending between the load end of the first lever arm and the first wheel assembly, and the second rod pivotably fastened to the load end of the second lever arm and extending between the load end of the second lever arm and the first wheel assembly.

Yet another embodiment of the invention disclosed herein is a shopping cart comprising a wheel assembly, a bent tubular support member having an upper end and a lower end, the lower end being positioned adjacent to the wheel assembly, a handle assembly having an arm extending out of the upper end of the support member, the arm being pivotably coupled to the support member, and a rod extending out of the lower end of the support member, the rod being pivotably coupled to the arm of the handle assembly.

Other preferred aspects of the present invention will become more clear from the detailed description herein described below.

DETAILED DESCRIPTION OF THE PREFERRED EMBODIMENTS

Figure 1:
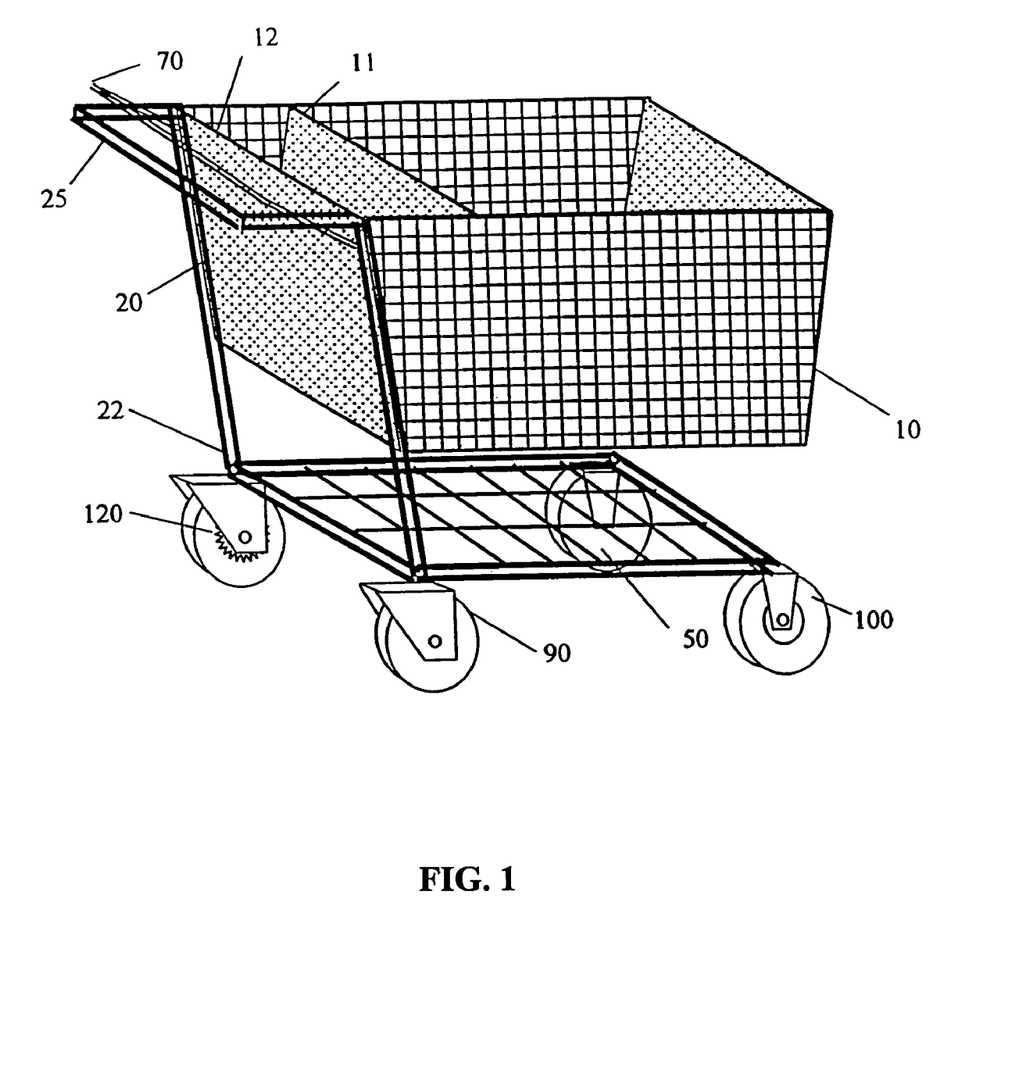
FIG. 1 is an isometric view of a shopping cart in accordance with an exemplary embodiment of the invention.

Refer first to FIG. 1 that represents an isometric view of an embodiment where the mechanism is shown on a shopping cart. The shopping cart of FIG. 1 includes a basket 10, a divider 11, a rear wall 12, a structural frame 20, vertical frame members 22, a handle 25, an undercarriage 50, an articulating handle 70, fixed rear wheels 90, front pivoting or turning wheels 100, and a braking mechanism including portion 120.

The basket 10 represents the area where a user may place items they wish to transport in the shopping cart. The shopping cart basket 10 can be made from a variety of materials including metal wire, metal tubing, expanded metal, molded plastics, or any other material that is capable of crating an open structure where items can be placed for transportation. The basket 10 may also be formed from a solid material that allows the basket 10 to hold liquid, granulated or powdered material. The material the basket 10 is made from may be coated, plated, or colored for appearance or for wear or corrosion resistance.

The shape of the basket 10 consists of four sides, and a bottom surface. While the embodiment of FIG. 1 is rectangular, other shapes are contemplated including round, elliptical, or a flat plate or screen with shortened or no sides. The method of manufacturing the basket 10 can be from molding, welding, bending or other type of manufacturing method that allows for the creation of the basket shape.

The basket 10 may consist of multiple baskets or basket areas. The basket 10 may have a divider, such as divider 11 in FIG. 1, and shelf where a user can place one or more children, or a purse of bag they do not want to place with the item they may purchase.

In FIG. 1, the rear wall 12 can be rotated up to allow for nesting of multiple carts. In yet another embodiment the entire basket can rotate into a vertical orientation to allow for nesting of carts.

The structural frame 20 creates the strength for the shopping cart. The frame 20 links the front pivoting or turning wheels 100, the fixed rear wheels 90, and the undercarriage 50, to the basket 10, and then to the handle 25 of the shopping cart. The structural frame 20 can be made from a variety of materials including round or square metal tubing, molded or formed plastics, or any other material that is capable of providing structural strength and linking the identified components.

The shape of the structural frame 20 can vary significantly between embodiments. Varieties of shapes are possible, including a shape where the undercarriage does not exist. In another embodiment, the shopping cart may consist of multiple baskets or multiple shelves where different items can be located.

In the embodiment of FIG. 1 the vertical frame member(s) 22 are straight, and run from the handle down to the rear wheels. Alternate embodiments for the rear members include "S" or "L" shaped members where the member slants forward from the handle 25, and then bends back to one of the rear wheels 90. The forward slant is made to provide an area for a person to move their legs as they walk and push the cart. The bend is made to bring the wheels further back so the cart does not tip back if a heavy child is placed in the rear of the cart. If the rear tube is not straight, a secondary tube can be used to protect the connecting of an activation rod from the articulating handle 70 to the braking mechanism. A portion 120 of the braking mechanism can be seen in the figure connected to a rear fixed tire, item 90.

The under carriage 50 is an open area for storing items. A secondary purpose of the undercarriage 50 is to provide a nesting area for the undercarriage of a second cart that may be nested. In the embodiment of FIG. 1, the structural frame 20 consists of a tube that extends from the rear of the cart to the front of the cart. As the tube transitions from the back to the front of the cart, the tube narrows to allow for nesting of additional carts. In another embodiment, the tube angles up or down as it transitions from the back to the front of the cart to allow for nesting of multiple carts.

Figure 2:
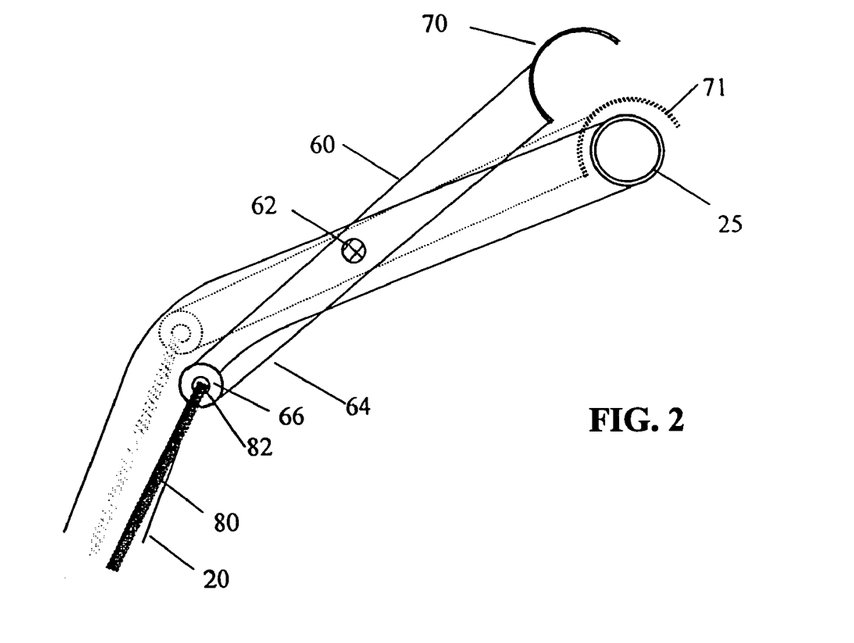
FIG. 2 is a detailed view of a handle mechanism in accordance with an exemplary embodiment of the invention.

Refer now to FIG. 2 that shows an embodiment of the structural frame handle 25, and the articulating handle 70. The articulating handle 70 is shown in an up position as item 70, and in a down position as item 71. In this embodiment, as the articulating handle 70 is pressed down the brake is disengaged.

The articulating handle 70 can be formed from wire, sheet metal or molded from plastic or similar material. The articulating handle 70 is connected to a pivoting arm 60. The pivoting arm 60 pivots about pivot point 62 such that when the articulating handle is depressed, the back 64 of the pivot arm 60, is lifted. The pivot point 62 consists of a hole in the pivot arm 60 connected by a suitable bearing mechanism such as a shoulder bolt or similar mechanism. As the rear part of the pivot arm 60 is lifted, the pivot arm 60 lifts the linkage rod 80.

The linkage rod 80 is shown enclosed within the frame of the shopping cart in FIG. 1. While the tube 22 that protects the link is shown as a part of the frame 20, the protection tube could be a separate member that is not part of the structural frame.

The linkage rod 80 is connected to the back end 64 of the pivot arm 60 of the articulating handle 70 with a simple mechanical linkage consisting of a hole 66 in the pivot arm 60, and a bend 82 in the linkage rod 80. The end of the bent section of the linkage rod 80 may be terminated with a cotter pin, speed nut or similar device. The termination may also be formed from a flat that is crushed onto the end of the linkage rod.

Figure 3:
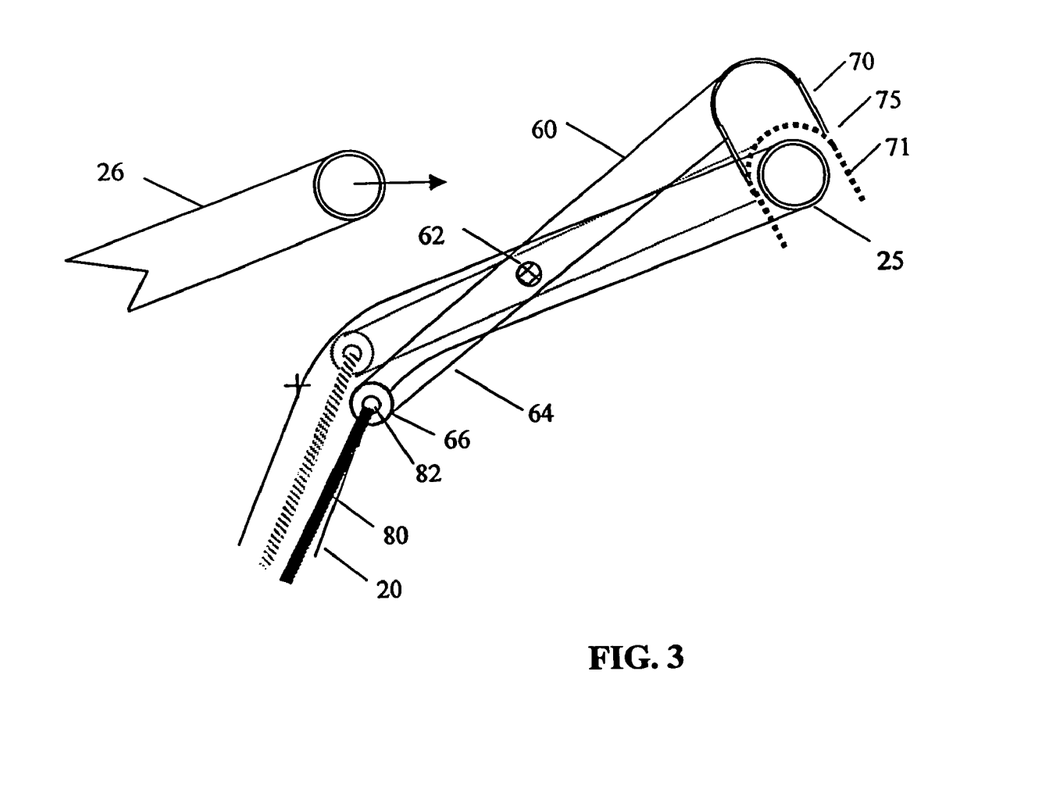
FIG. 3 is a detailed view of another handle mechanism in accordance with an exemplary embodiment of the invention.

Refer now to FIG. 3 that shows an alternate embodiment. In this embodiment, the articulating handle 70 is shown as a member with elongated sides covering the handle 25. In the raised position, an end 75 of the articulating handle is about tangent with an end on the handle 25. When the articulating handle 70 is depressed, as shown as item 71, the elongated sides of the handle 70 move over the frame handle 25. In this configuration a potential pinch point between the handle 25 and the articulating handle 70 is reduced.

The linkage rod 80 runs within, or along the side of, the structural frame. The linkage rod may also run within a portion of the frame 22. The linkage rod may also run within a secondary tube. The linkage rod continues down a tube and terminates at the braking mechanism. The weight of the linkage rod 80 maintains the articulating handle in the up position, and the brake in an activated position.

Figure 4:
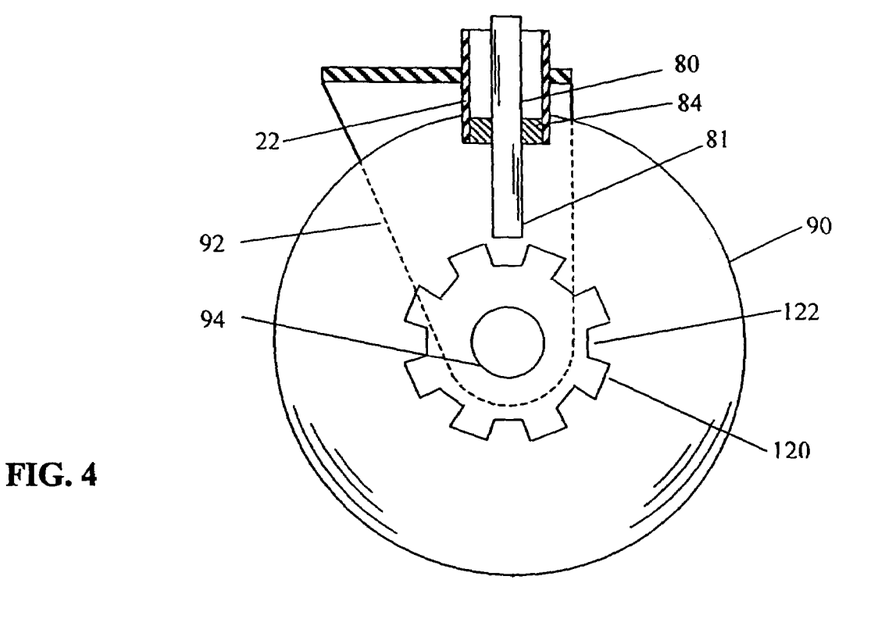
FIG. 4 is a detailed view of a braking mechanism in accordance with an exemplary embodiment of the invention.

Refer now to FIG. 4, which shows the braking mechanism. In this embodiment the linkage rod 80 is shown extending though the bottom of the vertical member 22 of the structural frame, item 20. As the linkage rod exits the structural frame, a guide bushing 84 is used to keep the linkage rod 80 in position relative to a braking gear 120.

The material used in the braking gear 120 can be metal or plastic. In the embodiment shown, the braking gear 120 is made from a metallic material due to the potential high loads the brakes may encounter if the basket 10 is full of heavy items, or if the cart is moving quickly when the brakes are engaged.

In this embodiment, the gear 120 consists of raised teeth and depressions where the end of the linkage rod 80 engages. When the linkage rod 80 engages into the gear 120 the tire 90 is prevented from turning. The gear 120 can be connected to or be an integral part of the tire 90. The tire 90 and gear 120 are supported by a bearing or hub 94. The hub 94 is connected to a support member 92. The support member 92 is then connected to the vertical frame member 22. From this figure, it can be seen that when the linkage rod 80 is lifted, the braking mechanism is disengaged. When the linkage rod 80 is lowered, the tip 81 of the linkage 80, engages into at least one tooth 122 of the braking gear 120. In this embodiment, gravity is capable of holding the brake engaged, and the invention does not require a spring to hold the brake in place. A user must simply overcome the force of gravity upon the linkage rod 80 and any frictional losses in the pivot and sliding mechanisms.

Figure 5:
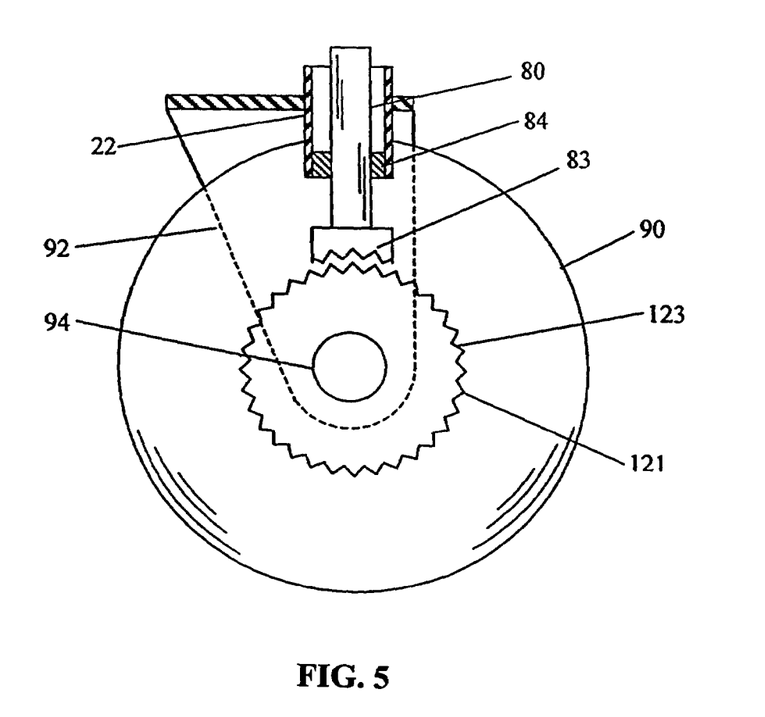
FIG. 5 is a detailed view of another braking mechanism in accordance with an exemplary embodiment of the invention.

FIG. 5 shows an alternate embodiment of the invention. In this embodiment, the end of the linkage rod has gear teeth 83 connected. The gear 121 is attached to the wheel. In this configuration, when the gear teeth 83 are brought into contact with the gear 121, the wheel 90 does not come to an immediate stop, but the wheel 90 will turn with intermittent braking action.

The gear 121 is a member with features on the peripheral edge that provides braking action. The gear 121 may consist of a semi-round member with teeth 123 that are square teeth, uni-directional teeth, triangular teeth, or one or more rounded lobes.

Unidirectional teeth would allow limited breaking of the wheel 90 in one direction, and full breaking of the wheel 90 in the opposite direction. The intermittent breaking is caused by the teeth 123 of the gear 121 and the gear teeth 83 meshing, and then skipping teeth.

The braking gear may consist of multiple rounded teeth. In this embodiment, the braking system provides limited braking of the cart. An advantage of this embodiment is that the shopping cart can still be moved without dragging the wheel. Another advantage is that if the user tries to operate the cart without disengaging the brake the cart will have variable braking. One or multiple lobes can be utilized. In addition, the configuration of the lobes can be adjusted using a follower in a lobed cam, to provide just a single breaking action for each revolution of the wheel to hundreds or more discreet braking positions per revolution of the wheel. The follower can be a bearing, or self-lubricating material such as Teflon®. The end 83 of the linkage rod 80 may be a follower consisting of a bearing that rides up and down on the outer surface of the gear 121. In this figure, thirty-two lobes are shown. In yet another advantage of this configuration no abrasion of the wheel occurred, since the lobe rolls over the cam, teeth on gear.

Refer back to FIG. 3 where you can see a handle 26. When a second cart is being nested, the handle 26 for the second cart slides against the pivoting member 60 of the articulating handle 70 on the first cart and depresses the pivoting member 60 and articulating the handle 70 of the first cart.

Figure 6:
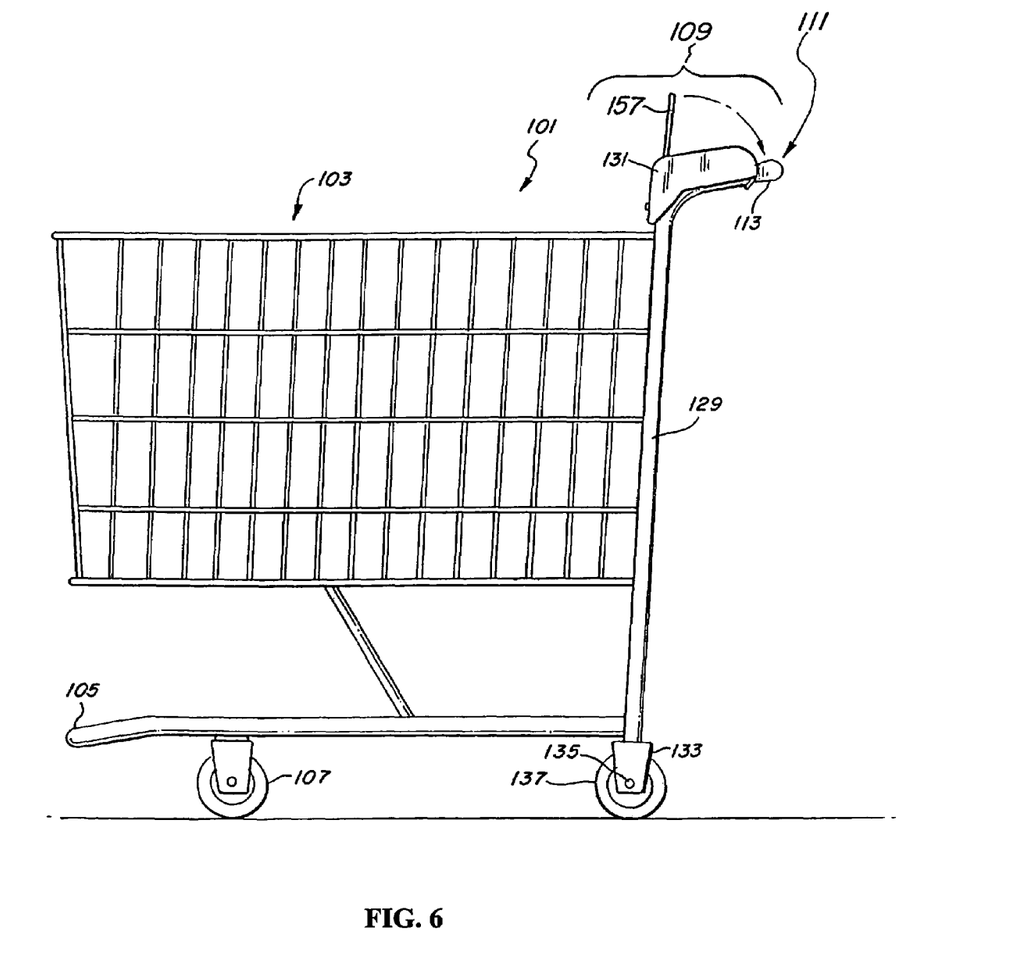
FIG. 6 is a side view of another shopping cart in accordance with an exemplary embodiment of the invention.

In FIG. 6, another embodiment of a shopping cart is shown. The cart 101 of FIG. 6 is a gravity actuated embodiment wherein force applied to the primary handle of the cart both disengages a braking mechanism, and causes movement of the cart. More particularly, the downward component of a force continuously applied to the cart via the handle first disengages the braking assembly by causing the handle to move downward, and then maintains the brake assembly in a disengaged state by preventing the handle from moving upward, while any forward component of such force causes the cart to move forward after the braking assembly is disengaged. Letting go of the handle causes the braking assembly to enter an engaged state wherein it prevents movement of the cart 101. The embodiment is gravity actuated in that the only force needed to engage the braking assembly is that of gravity once the handle has been released. No springs are used to apply force to engage the braking mechanism.

In FIGS. 6-10, the shopping cart 101 includes a basket assembly 103 including a back panel assembly 151, a lower frame assembly 105, forward pivoting wheels 107, and braking mechanism assembly 109. The braking mechanism assembly 109 includes a handle assembly 111 having lever arms 113 with a pivot hole 115, a lock rod hole 117, a lock rod end 119, a handle end 121, and a handle 123 extending between the handle ends 121 of the lever arms 113. The lever arms 113 of the handle assembly 111 extend into the ends of support casings 129, and are pinned to the casings 129 using the pivot pins 123 in such a manner that the arms can rotate around the pivot pins 123. The lock rod ends 119 of the lever arms 113 are rotatably coupled to the upper ends of lock rods 127 by lock rod pins 125. The lock rods 127 are positioned within, extend through, and extend out the lower ends of, the support casings 129. The lock rods 127 are positioned within the casings 129 at the lower ends of the casings 129 by the bushings 147. The lock rods 127 are suspended from the lever arms 113 such that the only fixed point at which the lock rods 127 and the shopping cart 101 are coupled together is at the lock rod pins 125.

Rotation of the handle assembly 111 around the pivot pins 123 causes the lock rods 127 to move up and down within the support casings 129. As such, pushing downward on the handle assembly 111 causes the lock rods 127 to lift up and retract at least partially into the support casings 129. The access holes 130 of the support casings 129 provide access for coupling the lock rods 127 to the lever arms 113. The access holes 130 are covered by covers 131, with the covers 131 being sized and shaped to provide room for movement of the lever arms 113 to more fully retract the lock rods 127 than would be possible if the access holes 130 were not included.

The covers 131 preferably cover the entire portion of the holes 130 and the channels 132, except for providing a slot through which the arms 113 can project and within which the arms 113 can slide. The covers 131 preferably have a rounded, and in some cases a somewhat bullet nose shaped, front end that covers an open ends of the support casings 129.

The support casings 129 are coupled to wheel mounting brackets 133. The wheel mounting brackets 133 function to retain and position wheels 137 and locking members 139 relative to the lower end of the lock rods 127. As such, if the lock rods are retracted into the support casings 129, the wheels 137 can rotate without interference from the lock rods. If the lock rods are allowed to drop down until they contact the locking members 139, the lock rods inhibit rotation of the wheels 137, particularly when in contact with one of the teeth 145 of a locking member 139. The wheels 137 and locking members 139 are rotatably coupled to the mounting brackets 133 through the use of axle assemblies 135. Spacers 141 help to position the wheels 137 and locking members 139 along the axle assemblies 135 and within the brackets 133. The locking members 139 are coupled to the wheels 137 by the fasteners 143.

The basket assembly 103 may be formed in any manner, and have any shape or size, suitable for the intended use of the cart. The basket assembly 103 may be a unitary piece or an assembly of pieces with each piece comprising any material or combination of materials. In some instances, a shopping cart in accordance with the invention may utilize a support frame but not a basket coupled to such a frame.

Figure 7:
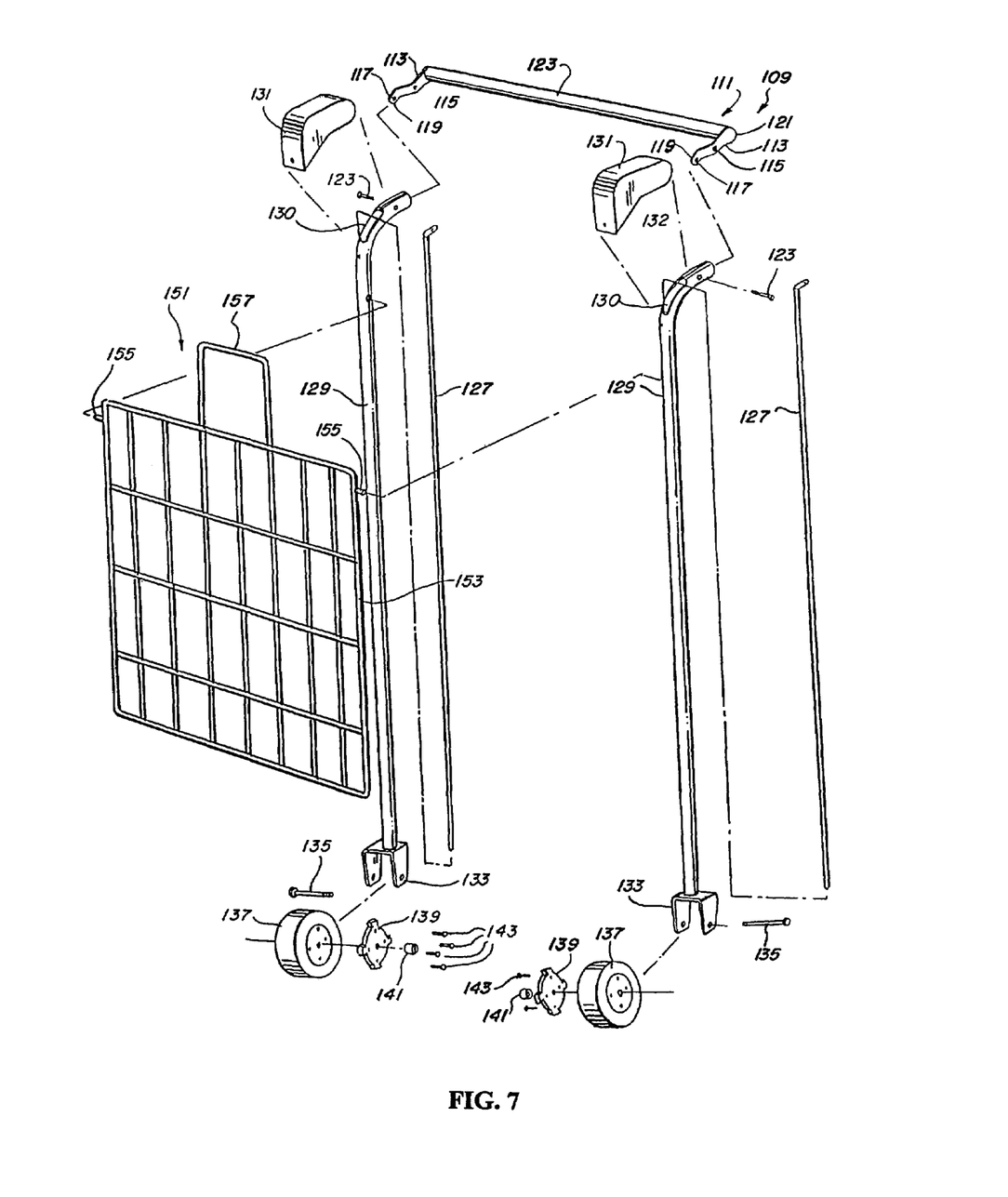
FIG. 7 is a partial exploded view of the shopping cart of FIG. 6.

As shown in FIG. 7, the basket assembly 103 includes a back panel assembly 151 that is rotatable relative to the rest of the basket assembly 103 to permit nesting of shopping carts. The back panel assembly 151 includes a back wall 153 that rotates about pivots 155. Rotation of the bottom of the back panel assembly 151 about the pivots 155 with the bottom of the assembly 151 rotating into the area enclosed by the basket assembly 103 causes a portion of the assembly 151 to rotate downward towards the handle 123 of the handle assembly 111, and to depress the handle assembly 151 to disengage the braking mechanism 109. In FIG. 7, the back panel assembly 151 includes an extension member 157 that extends upward from an upper edge of the back wall 153. Rotation of the panel assembly 151 causes the extension member 157 to contact the handle 123. In alternative embodiments, back wall 153 may extend sufficiently far up such that rotation of the back panel assembly 151 causes the back wall 153 to contact and depress the handle 123. Having the back panel assembly 151 push down on the handle 123 will in most instances require that the distance between the pivots 155 and the uppermost portion of the back panel assembly 151 be at least as long as the distance between the pivots 155 and the handle 123, regardless of the position of the handle 123.

It is contemplated that in some embodiments the extension member 157 may be moveable relative to the back wall 153, or may be somewhat flexible, to prevent damage to the shopping cart 101 if the back panel assembly 151 is rotated farther than is needed to depress the handle 123. It is also contemplated that in some instances the extension member 157 may also function as, or to support, a back or head rest.

The lower frame assembly 105 functions primarily to position the wheels of the cart relative to each other, and to provide a base to which the rest of the cart can be coupled. The frame assembly 105 may take any form, comprise any number of pieces, and comprise any material or combination of materials that allow it to function properly. However, it is contemplated that it is advantageous in some instances for the frame assembly 105 to comprise tubular members welded or fastened together.

Although shown with forward pivoting wheels 107, in some instances the cart may include rear pivoting wheels, and/or may include wheels that do not pivot. Moreover, the number of wheels may vary between embodiments, although it is contemplated that it is advantageous for a cart to have at least two wheels with one wheel positioned in front of a wheel acted on by the braking mechanism. In many instances it is more advantageous for a cart to have least three wheels with at least one wheel positioned in front of a wheel acted on by the braking mechanism. The type, construction, and positioning of wheels will likely vary between embodiments.

The handle assembly 111 may be a unitary piece or comprise a plurality of pieces, and each piece may comprise any material or combination of materials that allows the handle assembly to function to receive forces applied to disengage the braking mechanism and move the cart. In the embodiment shown, the lever arms 113 are type one levers, i.e. they each have a fulcrum/pivot (pins 123) positioned between the effort (i.e. the handle 123) and the load (i.e. the lock rods 127). It is contemplated that the lever arms 113 may advantageously comprise a rigid metal or plastic so as to not deform when functioning as levers between the handle 123 and the lock rods 127.

The handle 123 may comprise any shape or size that permits it to be grasped and to transfer the necessary forces to other portions of the cart. However, it is contemplated that in some instances the handle may have a length approximately equal to the width of the cart, and may be shaped such that it fits within a cylindrical volume having a diameter of one and one half inches.

Figures 8, 9:
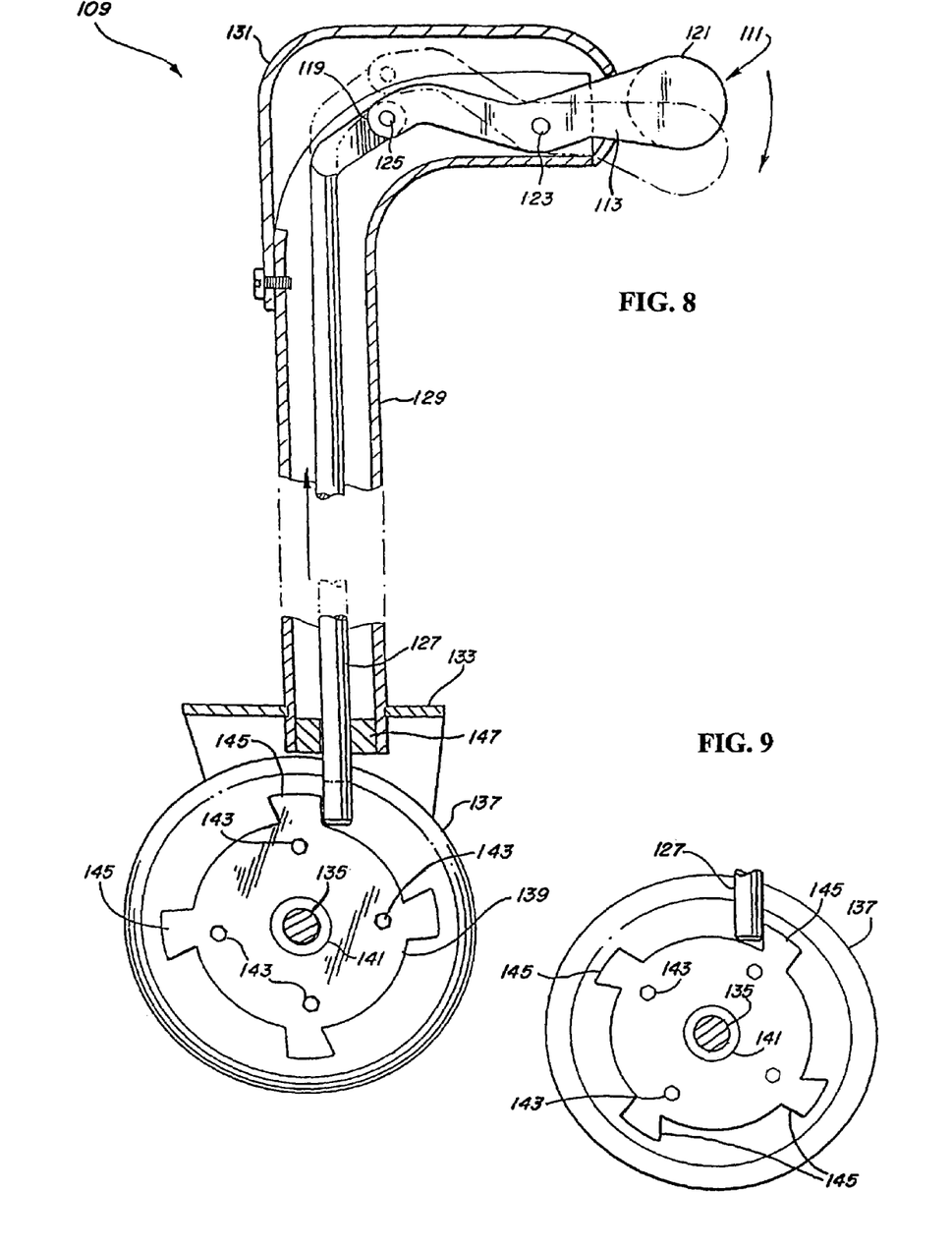
FIG. 8 is a partial cross sectional view of the shopping cart of FIG. 6 with a wheel stopped after a backward (clockwise) rotation.
FIG. 9 is a partial cross sectional view of the shopping cart of FIG. 6 with a wheel stopped after a forward (counter-clockwise) rotation.
Figure 10:
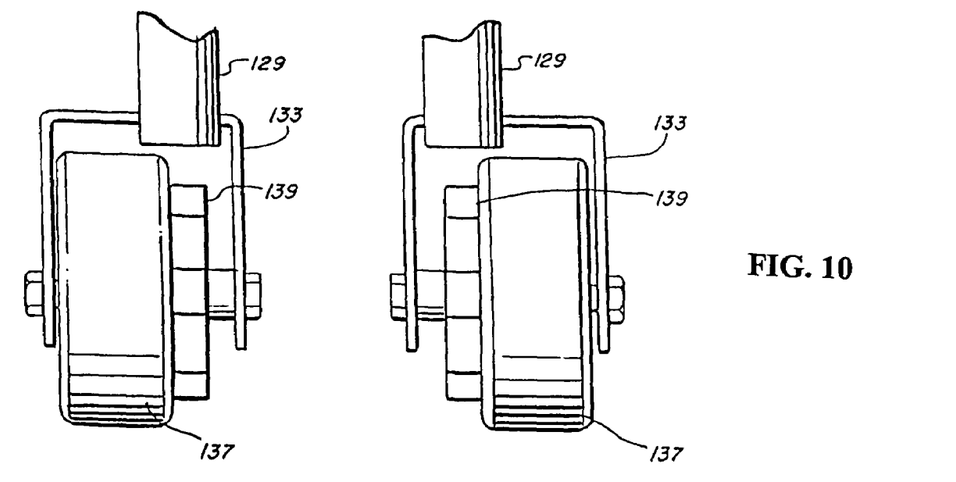
FIG. 10 is a detail view of the wheel portions of the brake assembly of the shopping cart of FIG. 6.

The lock rods 127 may vary in size, shape, and construction between embodiments. However, it is contemplated that the rods 127 may advantageously be formed from steel rods. Moreover, as shown in FIGS. 7 and 8, the rods 127 may include a bent and flattened upper end to facilitate pinning them to the lever arms 113 of the handle assembly 111. In such an instance, the rods 127 may extend forward from the load ends of the lever arms 113 before extending down through the remainder of the length of the support casings 129.

The support casings 129 are preferably formed from a tubular material such that they have a hollow interior, and may advantageously be formed from tubular aluminum, steel, or plastic. The cross sectional shape of the casings 129 may vary between embodiments such that some embodiments have casings with circular cross section while others have casings with rectangular or some other non-circular cross sections. The support casings 129 preferably comprise a long lower section angled relative to a shorter upper section. In such instances, as shown, the arms 113 of the handle assembly can be inserted and pinned into the shorter upper sections while the lock rods 127 can extend through the longer lower sections. In some instances the support casings 129 will function to support an end of the basket assembly 103, and to position the basket relative to the frame assembly 105.

The locking members 139 are coupled to the wheels 137 such that they rotate as the wheels 137 rotate. The wheels 137, locking members 139, and lock rods 127 are coupled together such that the lock rods 127 can be slid between radial teeth 145 of the locking members 139. The term "between" in this instance means that the ends of the lock rods 127 intersect the paths taken by the teeth 145 as they rotate with the wheels 137.

It is preferred that, as shown in FIG. 8, an end of a lock rod 127 that comes in contact with a tooth 145 be linear with the line of the lock rod 127 being substantially parallel to a surface of the tooth 145 when in contacts that surface of the tooth 145 to increase the area (or length of the line) over which the tooth and rod contact each other. To facilitate this, the axle about which the wheel 137 and the locking member 139 rotate should be positioned slightly in front of, or slightly behind, the line of the lock rod 127.

It is also preferred that, as shown in FIGS. 8 and 9, opposite sides of each tooth be angled relative to each other such that each side is substantially parallel to the lock rod 127 as it comes in contact with the lock rod 127. As each tooth has a width and rotates about an axis, opposite sides of the tooth have to be angled relative to each other if each side is to be substantially parallel to the lock rod 127 as it comes in contact with the lock rod 127. The relative angle between the sides, as well as the orientation of each side will vary between embodiments. Such variances will depend at least in part on the relative positioning of the wheels 137 to the lock rods 127 and the width of each tooth 145.

Figure 11:
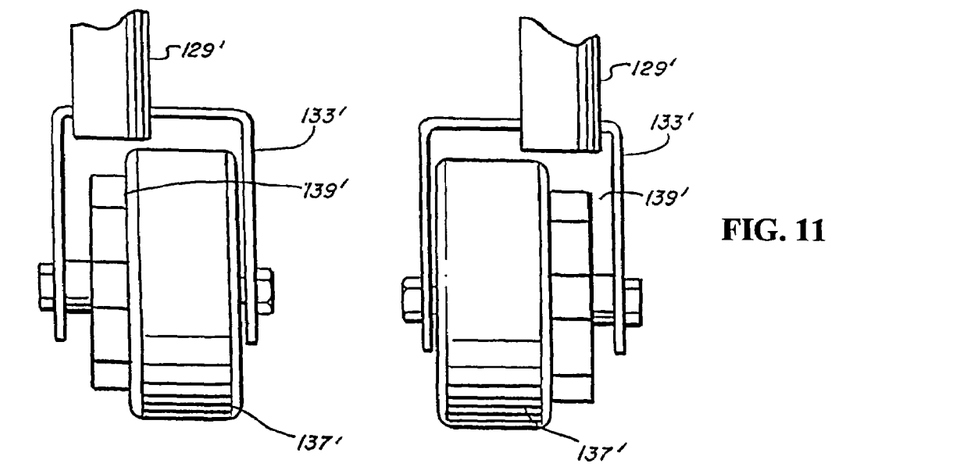
FIG. 11 is a detail view of alternate wheel assemblies for the shopping cart of FIG. 6.

In the embodiment of FIGS. 6-10, the locking members 139 are positioned on the inside of the wheels 137, and the support casings 129 intersect the brackets 133 on the insides of the brackets to insure that the rods 127 properly interact with the locking members 139. However, in alternative embodiments the locking members may be positioned on the outside of the wheels such as is shown in FIG. 11. In FIG. 11, support casings 129' are positioned on the outer sides of the brackets 133', and the locking members 139' are positioned on the outer sides of the wheels 137'.

Figure 12:
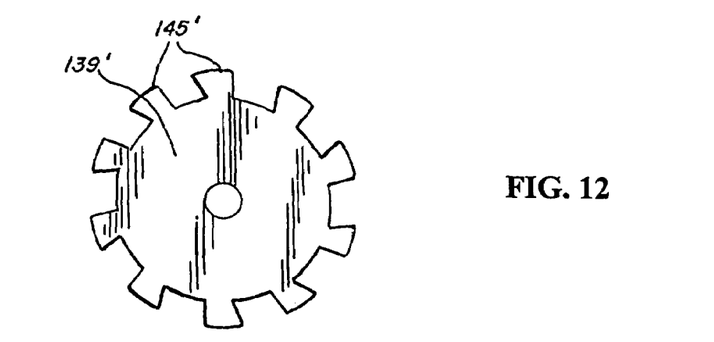
FIG. 12 is a side view of an alternate locking member for the shopping cart of FIG. 6.

The locking members 139 may comprise any material or combination of materials that permit them to function in the manner described, but are preferably formed from a hard and durable material to withstand the forces applied to them and to have a long life. It is contemplated that in some instances it is advantageous to utilize locking members having at least one and not more than ten radial teeth. FIG. 12 illustrates a locking member 139' having 10 radial teeth 145'. It is also contemplated that it may be advantageous for locking members to have at least three teeth and/or not more than four teeth.

Figure 13:
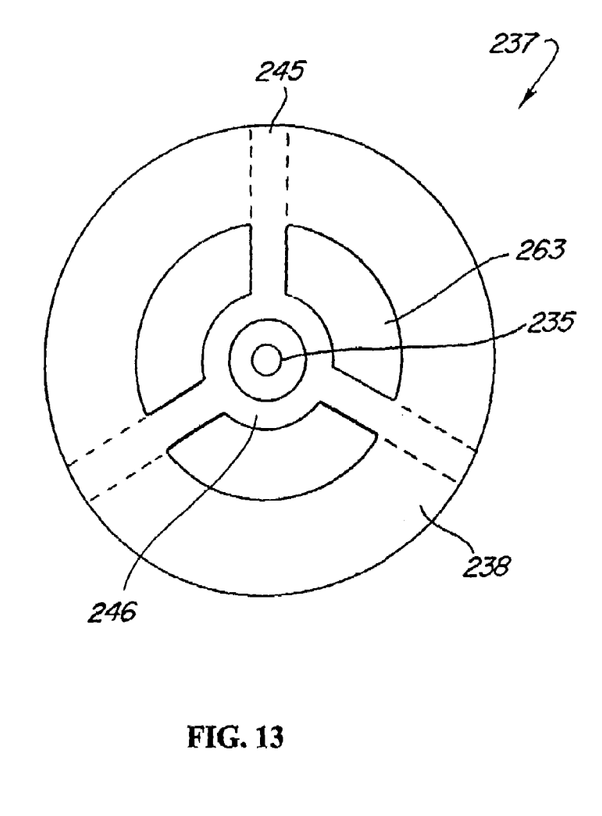
FIG. 13 is a side view of an alternate wheel for the shopping cart of FIG. 6.
Figure 14:
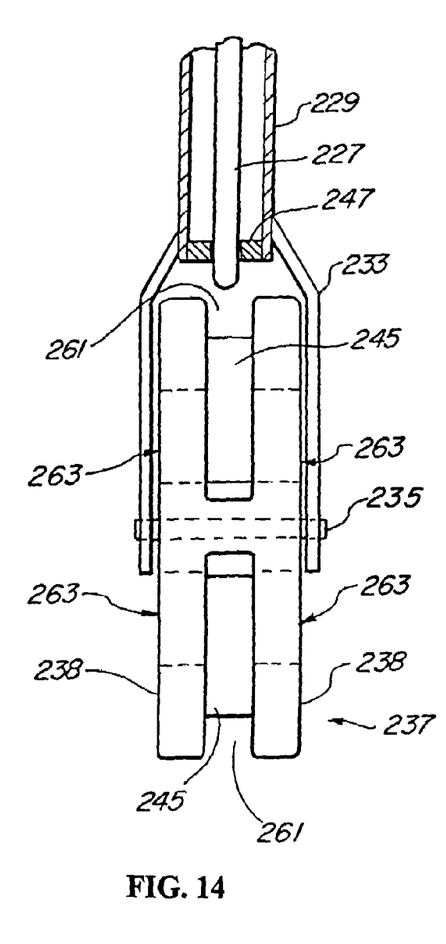
FIG. 14 is a partial cutaway front view of an alternate wheel assembly for the shopping cart of FIG. 6.

FIGS. 13 and 14 depict an alternative embodiment in which the wheel 137 and locking member 139 combination of the breaking system 109 of the cart 101 of FIG. 6 is replaced with a notched wheel 237 having spokes 245 radiating from a hub 246. The spokes 245 separate notches/cavities 261 within circular side walls 238. Activating and deactivating a braking system utilizing the wheel 237 comprises raising and lowering the rod 227 at least partially positioned in the casing 229 by the bushing 247. Lowering the rod 227 causes it to fall between the spokes 245. The spokes 245 function in a similar manner to the teeth 145 of the cart 101 of FIG. 6. In some embodiments, as with the teeth 145 of the cart 101, the spokes 245 may have non-parallel sides bordering the notches to facilitate a side being parallel to the rod 227 when the rod and side come in contact, regardless of whether the wheel 237 is rotating forward or backward. Although shown extending all the way to the perimeter of the wheel 237, it is contemplated that in some instances one or more of the spokes 245 will be shorter so as to have an outer end surface forming the bottom of a channel for receiving an end of the rod 227, with inside surfaces of the side walls 238 guiding that end towards one of the notches 261 while the wheel 237 rotates.

The wheel 237 is also provided with openings 263 extending through the circular side walls 238. The openings 263 provide a mechanism by which debris entering the notches 261 can be ejected. It is preferred that the openings 263 extend radially from the bottoms of the notches 261 such that there are no sidewalls adjacent the hub 246 preventing movement of debris out of the notches 261.

The cart 101 has numerous desirable features. One such is that disengaging the braking system is done using the same handle that is used to push the cart, and does not require any actions other than what are normally engaged in when pushing a cart. A related feature is that the braking mechanism is gravity actuated, i.e. that the weight of the lock rods is sufficient to overcome the weight of the handle, and is not supplemented by the use of springs. Another desirable feature is that the support casings 129 and the mounting brackets 133 protect a majority of the other components of the braking system 109. Yet, another is that the braking assembly 109 comprises relatively few parts. Still another is that the braking assembly 109 does not include any fragile parts.

The cart 101 differs from the cart of FIG. 1 at least in part because the handle used to disengage the braking mechanism is the primary handle of the cart, i.e. the handle intended to normally be used to move the cart. Although different shopping carts may include different types of handles, and may include multiple members that can be used as secondary handles, most shopping carts have a primary handle that is, by design, easily recognizable as the handle the cart's designer intended to be used for moving the cart.

It is advantageous to utilize the primary handle of the cart as the mechanism for deactivating the braking mechanism of the cart 101 as doing so eliminates the need for someone operating the cart to take any actions to engage and disengage the breaking mechanism other than what they would normally take when operating the cart. As such, a person wanting to move the cart simply applies a force to the primary handle to disengage the braking mechanism and to move the cart. Although the force applied requires a downward component to disengage the braking mechanism, applying a force with such a component is typically a natural part of moving the cart using the handle.

As has been mentioned, the braking mechanisms described herein are gravity actuated. Releasing the handle used to disengage the braking mechanisms allows gravity to act on the lock rods to pull each one down (and rotate the handle up) to intersect the path of teeth of a locking member to inhibit rotation of the wheel it is coupled to. Eliminating the use of springs and other biasing mechanism greatly simplifies the braking mechanism thus making it easier and cheaper to manufacture and install, and minimizing possible points of failure. Reducing the number of parts used is also facilitated by using the lock rods to function as the weights in the system, the members that extend between the handle arms and the wheels, and as the primary mechanism for stopping the cart. Making them long enough to extend between the handles and the wheels increases their weight. Increasing their weight facilitates the braking mechanism being gravity actuated. Increasing the thickness or the density of the material of the rods also tends to make them better suited to endure the forces applied when braking the wheels.

Thus, specific embodiments and applications for a braking system for a shopping cart have been disclosed. It should be apparent, however, to those skilled in the art that many more modifications besides those described are possible without departing from the inventive concepts herein. For example, the shopping braking mechanism may be activated to the front wheels, or the braking system may be located on both sides of a wheel. The braking system may also apply the brakes by pressing a pin into a detail of the tire on the shopping cart such as holes placed on the periphery of the tire. The inventive subject matter, therefore, is not to be restricted except in the spirit of the appended claims.

What is claimed is:

1. A shopping cart comprising:
a body having a forward end and a rear end;
first and second wheel assemblies positioned on opposite sides of the body;
a braking gear coupled to each of the first and second wheel assemblies;
a handle assembly having first and second arms, each arm pivotably coupled to the body at the rear end to form a type one lever, each lever arm having a load end and an effort end with a cross member extending between the effort ends of the first and second lever arms;
first and second rods, the first rod pivotably fastened to the load end of the first lever arm and extending between the load end of the first lever arm and the first wheel assembly, and the second rod pivotably fastened to the load end of the second lever arm and extending between the load end of the second lever arm and the second wheel assembly, the first and second rods each respectively engaging the braking gear in the first and second wheel assemblies when the rods are under force of gravity alone; and
the cross member rotatable such that full rotation of the cross member in a rotational direction disengaging the first and second rods from the braking gear imparts a force on the body toward the forward end for causing forward movement of the shopping cart.

2. The shopping cart of claim 1 wherein the first and second rods weigh sufficiently more than the cross member such that the rods cause the handle assembly to pivot to lower the load ends of the lever arms and to raise the effort ends of the lever arms and the cross member against the pull of gravity when gravity is the only substantial force acting on the cross member.

3. The shopping cart of claim 1 wherein the cross member is a primary handle of the shopping cart.

4. The shopping cart of claim 1 wherein the first and second wheel assemblies each comprises a wheel having a spoked center portion positioned between circular side walls, the center portion and side walls forming notches in the perimeter of the wheel into which ends of the first and second rods can be extended through rotation of the handle assembly.

5. The cart of claim 1 wherein the handle assembly is used to push the shopping cart.

6. A shopping cart comprising:
a body;
first and second wheel assemblies positioned on opposite sides of the body;
a handle assembly having first and second arms, each arm pivotably coupled to the body to form a type one lever, each lever arm having a load end and an effort end with a cross member extending between the effort ends of the first and second lever arms;
first and second rods, the first rod pivotably fastened to the load end of the first lever arm and extending between the load end of the first lever arm and the first wheel assembly, and the second rod pivotably fastened to the load end of the second lever arm and extending between the load end of the second lever arm and the second wheel assembly, the first and second rods not being biased by springs; and
a back panel assembly rotatably coupled to the body such that the back panel assembly is rotatable about an axis wherein rotation of the back panel assembly about the axis can cause a portion of the back panel assembly to contact the cross member.

7. A shopping cart comprising:
a wheel assembly;
a bent tubular support member having an upper end and a lower end, the lower end being positioned adjacent to the wheel assembly, the support member having a covered exterior opening extending to a hollow interior of the member, the opening being positioned at or near the bend in the support member;
a handle assembly having an arm extending out of the upper end of the support member, the arm pivotably coupled to the support member, the covered opening of the support member positioned relative to the arm of the handle assembly such that pivoting the arm in a first direction causes an end of the arm to extend into the opening, and pivoting the arm assembly in a second direction causes the end of the arm to retract into the support member and not to extend into the opening; and
a rod extending out of the lower end of the support member, the rod pivotably coupled to the arm of the handle assembly.

8. The cart of claim 7 wherein the rod has a linear end opposite an end coupled to the arm of the handle assembly, and the wheel assembly comprises a wheel rotating about an axis that is not in line with the linear end of the rod.

9. The cart of claim 8 wherein the rod is moveably coupled to the cart such that it can slide within the support member to be positioned between two teeth radially extending from a locking member that is part of the wheel assembly, and to contact one of the two teeth along a side that is parallel to a side of the rod at the point of contact.

10. The cart of claim 9 wherein the locking member comprises three or four radially extending teeth.

11. The cart of claim 7 wherein the handle assembly is used to push the shopping cart.

* * * * *